United States Patent
Koniki et al.

(10) Patent No.: US 8,019,724 B2
(45) Date of Patent: Sep. 13, 2011

(54) SOFTWARE FRAMEWORK FOR EVOLVING SPECIFICATIONS IN PROCESS CONTROL SYSTEM

(75) Inventors: Ramesh Babu Koniki, Bangalore (IN); Vibhor Tandon, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 825 days.

(21) Appl. No.: 12/054,394

(22) Filed: Mar. 25, 2008

(65) Prior Publication Data

US 2009/0249367 A1    Oct. 1, 2009

(51) Int. Cl.
*G06F 7/00*    (2006.01)

(52) U.S. Cl. .................................................. 707/626

(58) Field of Classification Search .................. None
See application file for complete search history.

(56) References Cited

U.S. PATENT DOCUMENTS

| | | | |
|---|---|---|---|
| 6,594,530 | B1 | 7/2003 | Glanzer et al. |
| 6,999,824 | B2 | 2/2006 | Glanzer et al. |
| 2003/0033442 | A1 | 2/2003 | Halpern et al. |
| 2003/0121024 | A1 | 6/2003 | Hill et al. |
| 2004/0055005 | A1* | 3/2004 | Creswell et al. ............ 719/315 |
| 2004/0117166 | A1 | 6/2004 | Cassiolato |
| 2005/0027377 | A1 | 2/2005 | Lucas et al. |
| 2007/0075916 | A1 | 4/2007 | Bump et al. |
| 2007/0277168 | A1 | 11/2007 | Vetillard |

OTHER PUBLICATIONS

Fieldbus Foundation, Foundation Specification Common File Format, FS 1.5, Mar. 14, 2000, pp. 1-48.
Fieldbus Foundation, Foundation Specification Common File Format, FS 1.6, Nov. 5, 2001, pp. 1-63.
Fieldbus Foundation, Foundation Specification Common File Format, FS 1.7, Oct. 8, 2003, pp. 1-65.
"Control Engineering", http://www.controleng.com/article/CA6490898.html, Downloaded circa: May 12, 2007, pp. 1-11.
"The Foundation Fieldbus Primer", http://www.fieldbusinc.com/downloads/primer1_1.pdf, Released Date: Jun. 24, 2001; 2001, pp. 1-36.
"144LD, 244LD Intelligent Buoyancy Transmitters Communication With FF-Fieldbus ", http://www.foxboro-eckardt.com/pdf/TI_FoxEck/TI_EML0610Q_144LD_244LD_FF_en_240FF_20.pdf, Date:Jan. 2003, pp. 1-31.
"Communication Module M 700® FF 700(X)" http://us.mt.com/mt_ext_files/Editorial/Generic/3/BA_Transmitter_M700_X_module_FF700X_Editorial-Generic_1163414435865_files/BA_M700_Module_FF700_X_e_SW_1_x_Sept06.pdf, Downloaded circa: Mar. 2007, pp. 1-59.
"B&R—Foundation Fieldbus", http://www.br-automation.com/cps/rde/xchg/br-productcatalogue/hs.xsl/products_85698_ENG_HTML.htm, Downloaded circa: May 2007, pp. 1-2.

(Continued)

*Primary Examiner* — Pierre M. Vital
*Assistant Examiner* — Truong Vo

(57) ABSTRACT

A software application architecture based on object oriented concepts. According to an aspect, upgrading the application to support newer versions of a standard describing device description is simplified. According to another aspect, the application is designed to be tolerant to changes (additions or modifications) introduced by future/later versions not yet supported by the application. In an embodiment, the approaches are applied in the context of a parser designed to parse device descriptions of different versions.

21 Claims, 8 Drawing Sheets

OTHER PUBLICATIONS

"Temperature Transmitters TF02/TF02-EX (Head Mounted) and TF202/TF202-EX (Field Mounted)", http://library.abb.com/GLOBAL/SCOT/SCOT211.nsf/VerityDisplay/C2EC129915D7796CC1257146002DBEE8/$File/42-11-51-EN-01-03__2006.pdf, Date of issue: Mar. 2006, pp. 1-42.

"Rotamass 3-Series Coriolis—Massflowmeter Integral Type RCCT3 Remote Type RCCF31 + RCCS3 Fieldbus Communication Type", http://www.yokogawa.com/us/ia/pdf/IMRotamass3FFed1light.pdf, Date: Jul. 2005; 1st Edition, pp. 1-126.

"Fieldbus Foundation", "FOUNDATION™ Specification Common File Format", Revision: FS 1.8, Date: Dec. 6, 2005, pp. 1-71.

* cited by examiner

SOFTWARE FRAMEWORK FOR EVOLVING SPECIFICATIONS IN PROCESS CONTROL SYSTEM

COPYRIGHT NOTICE

A portion of the disclosure of this patent document contains material which is subject to copyright protection. The copyright owner, Honeywell International Incorporated, has no objection to the facsimile reproduction by anyone of the patent document or the patent disclosure, as it appears in the US Patent and Trademark Office patent file or records, but otherwise reserves all copyright rights whatsoever.

BACKGROUND OF THE INVENTION

1. Field of the Invention

The present invention generally relates to process control system, and more specifically to a method and apparatus providing a software framework for evolving versions of specifications in process control systems.

2. Related Art

A process control system generally contains several field devices, which are operable to implement a desired control process (e.g., oil refinery, manufacturing operation, etc.). Examples of field devices include valves, positioners and switches, which are controlled to implement the control process.

Specifications are provided typically for interoperability of various systems/devices, etc., in a process control system based on agreed conventions/standards. The specifications can indicate various aspects such as the formats of data, the services to be provided or available for use from external systems, etc.

Specifications often evolve, typically identified by version numbers. In general, each version of the specification is intended to provide a new feature (possibly directed to newly introduced components/devices/software, etc.) and/or address known problems with prior versions.

There is a general need to implement software applications which operate in the context of such evolving specifications in process control plants.

BRIEF DESCRIPTION OF THE DRAWINGS

The present invention will be described with reference to the accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

Figure 1:
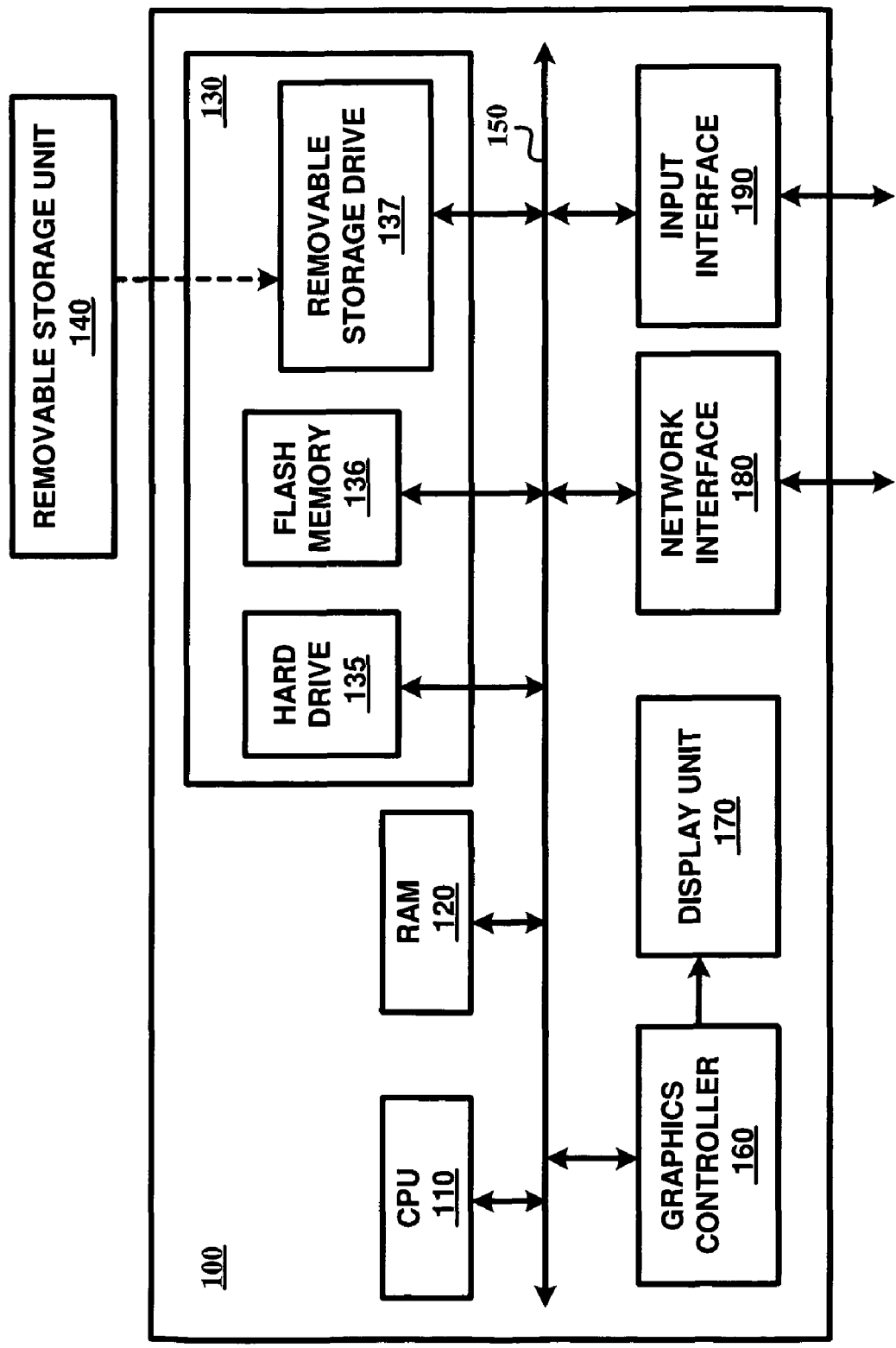
FIG. 1 is a block diagram of a digital processing system illustrating an example device in which several aspects of the present invention can be implemented.

An aspect of the present invention provides a framework using which software applications can be designed for evolving specifications in a process control system. In an embodiment, a set of version objects are implemented at least for features added or modified by a corresponding version compared to a prior version. Class factories are also provided to instantiate the version objects. Information is generated representing the class factories which can be used to instantiate the corresponding version object.

When the application is invoked by an appropriate interface/command requiring processing according to a specific version, the factory information is examined to select a factory object designed to instantiate a version object which can process the received inputs. A parser instance is created by instantiating the corresponding version object. The inputs are processed using the created parser instance.

Such a framework may offer several advantages. For example, upgrading the software application to support newer versions may be simplified.

In one implementation, the factory information is in the form of a linked list of nodes, wherein each node pointing to a corresponding class factory. The class factory is selected by traversing the linked list. The linked list may be traversed to determine the selected class factory as corresponding to a version object of a version number greater than or equal to the version identifier suited to process the received inputs.

All of the class factories may be implemented to derive from a same base factory. On the other hand, each version object (except a version object for the start version) derives from a version object designed to parse an immediate previous version. Therefore, each version object may merely need to implement changes (sections added/modified) compared to a previous version.

Therefore, addition of support for a new version may entail implementing the new version object (parsing the sections changed in comparison to the prior latest version) and adding the corresponding class factory to the chain.

To gracefully handle changes in any unsupported versions, a last version object (with the corresponding class factory as the tail of the chain) is used. The last version object returns an error code when sections changed by such unsupported version are encountered, thereby providing tolerance to changes in the unsupported version.

In an embodiment, the above-described features are implemented in the context of a parser implemented to parse device descriptions of different versions of a protocol standard.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Digital Processing System

FIG. 1 is a block diagram illustrating the details of digital processing system 100 in which several aspects of the present invention are implemented. At least some of the aspects are operative by execution of appropriate software instructions.

Digital processing system 100 may contain one or more processors such as central processing unit (CPU) 110, random access memory (RAM) 120, secondary memory 130, graphics controller 160, display unit 170, network interface 180, and input interface 190. All the components except display unit 170 may communicate with each other over communication path 150, which may contain several buses as is well known in the relevant arts. The components of FIG. 1 are described below in further detail.

CPU 110 may execute instructions stored in RAM 120 to provide several features of the present invention (including the parser and other blocks described below). In general, the instructions together constitute a user application, which is according to a framework provided according to various aspects of the present invention. As will be clear from the description below, the framework lends to easy upgrades to conform to evolving standards as well as be tolerant to newer standards not yet specifically implemented by the software application.

While the examples herein are provided with respect to software applications implemented on a single (standalone) system, it should be appreciated that several aspects of the features can be implemented on network-based applications, as will be apparent to one skilled in the relevant arts by reading the disclosure provided herein.

CPU 110 may contain multiple processing units, with each processing unit potentially being designed for a specific task. Alternatively, CPU 110 may contain only a single general-purpose processing unit. RAM 120 may receive instructions from secondary memory 130 using communication path 150, and also support the objects while the user interface is provided.

Graphics controller 160 generates display signals (e.g., in RGB format) to display unit 170 based on data/instructions received from CPU 110. Display unit 170 contains a display screen to display the images defined by the display signals. Input interface 190 may correspond to a keyboard and/or mouse. The display unit and input interface can be used to provide a suitable interface to manage field devices according to various aspects of the present invention.

Network interface 180 may contain one or more physical interfaces, which provide connectivity to various control networks as well as client systems providing user interface. For example, network interface 180 may enable central server 350 to interface with both the control network and a LAN on which client systems are connected.

Secondary memory 130 (characterized by non-volatile storage) may contain hard drive 135, flash memory 136 and removable storage drive 137. Secondary memory 130 may store the data and software instructions (e.g., the modules described above), which enable digital processing system 100 to provide several features in accordance with the present invention.

Some or all of the data and instructions may be provided on removable storage unit 140, and the data and instructions may be read and provided by removable storage drive 137 to CPU 110. Floppy drive, magnetic tape drive, CD-ROM drive, DVD Drive, Flash memory, removable memory chip (PCMCIA Card, EPROM) are examples of such removable storage drive 137.

Removable storage unit 140 may be implemented using medium and storage format compatible with removable storage drive 137 such that removable storage drive 137 can read the data and instructions. Thus, removable storage unit 140 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 140 or hard disk installed in hard drive 135. These computer program products are means for providing software to digital processing system 100. CPU 110 may retrieve the software instructions, and execute the instructions constituting a user application.

As noted above, the user application may be implemented and operate according to a framework provided according to several aspects of the present invention. Accordingly, the description is continued with respect to the operation of an application when executed, according to an aspect of the present invention.

3. Internal Operation of an Application

Figure 2:
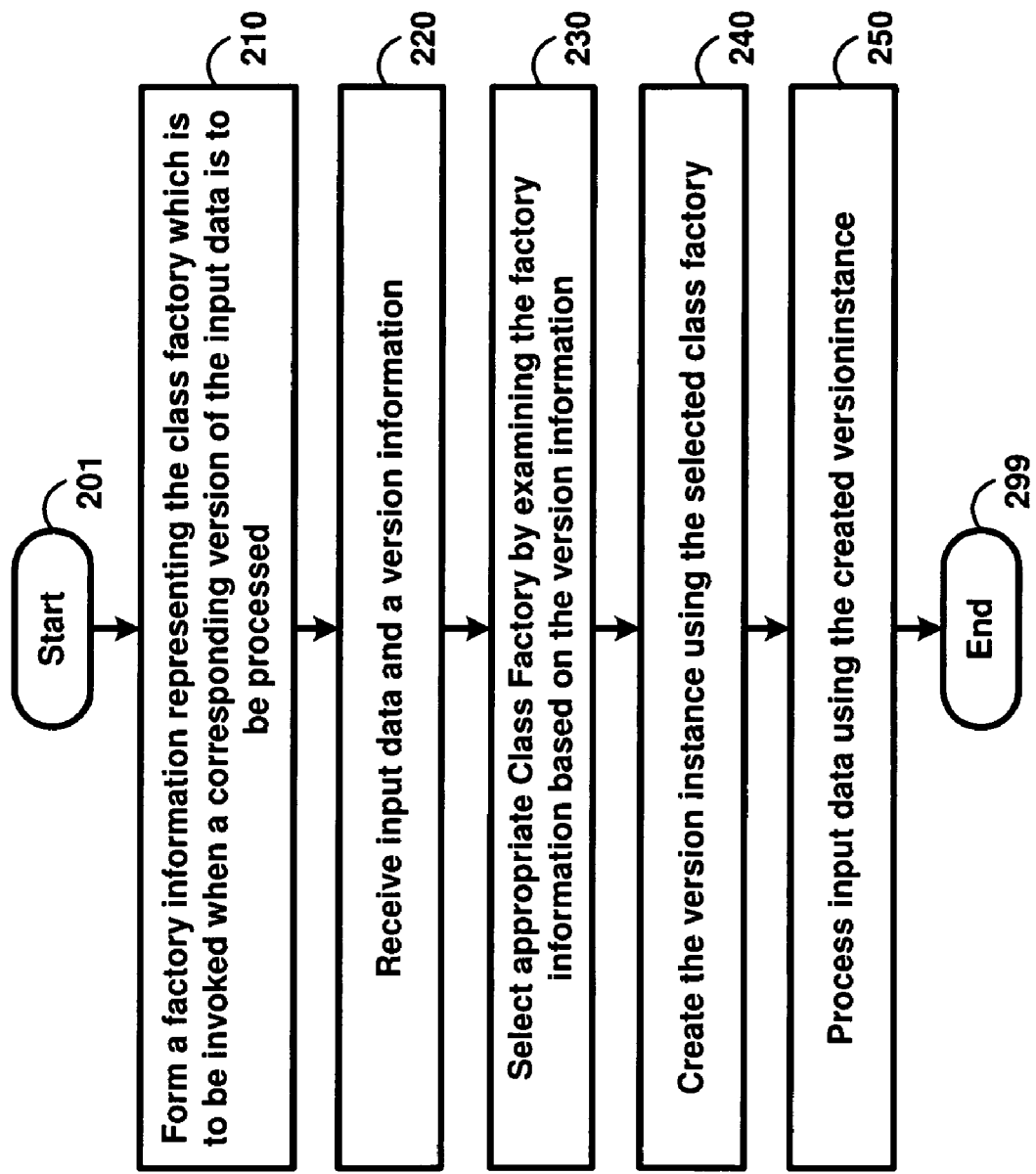
FIG. 2 is a flowchart illustrating the implementation and/or operation of a software application implemented according to an aspect of the present invention.

FIG. 2 is a flowchart illustrating the internal operations of an application in an embodiment of the present invention. The flowchart is described with respect to FIG. 1 merely for illustration. However, the features can be implemented in other environments as well.

In addition, the steps are described in a specific sequence merely for illustration. At least some of the steps can be implemented in a different sequence (or in an overlapping manner in parallel on a time scale) as will be apparent to one skilled in the relevant arts.

Also, the operation/implementation of the application refers to various object oriented language concepts, which are described in further detail in a book entitled, "Object Oriented Analysis and Design with Applications by Grady Booch". The flowchart begins in step 201 in which control passes to step 210.

In step 210, factory information, representing the class factory which is to be invoked when a corresponding version of the input data is to be processed, is formed. As is well known, when a class factory is invoked, a corresponding object is instantiated. The object in this case corresponds to a specific version object which is designed to process input data of a corresponding version. It should be appreciated that the information is formed dynamically in response to execution of the software instructions constituting the application.

In step 220, input data and a version information (based on which the input data is represented) is received. The input data and the version information can be received from different sources or the same source.

In step 230, an appropriate class factory is selected by examining the factory information based on the version information. In general, it is desirable that a class factory corresponding to version object designed to process at least the changes (additions, modifications, etc.) introduced by the corresponding version. However, higher-level versions may also be selected, particularly when such matching version number is absent in the factory information and the versions are backward compatible.

It should be appreciated that the factory information is formed as data/bits distinct from the instructions implementing the selection of step 230. In other words, the factory information is not embedded or hardcoded in the instructions (for example, as data compared in the if-then-else statements), which enables the factory information to reflect any later added versions as well.

In step 240, a version (object) instance is created using the selected class factory. In general, by invoking an appropriate method provided within the class factory, the corresponding object can be suitably instantiated. The instantiated object represents the processing logic suited for processing the specific version of the input data.

In step 250, the appropriate device descriptions are processed using the created version instance. Since the appropriate version object is instantiated, the input data may be accurately processed. The flowchart ends in step 299.

Applications, according to the features described above, can be implemented, and/or deployed in various environments. In an embodiment, the input data corresponds to device description data which is specified according to versions which evolve over time and the application is implemented in systems deployed in a process control plant. The need for applications of the present invention in process control plant is first established below.

4. Need in Process Control Plants

A process control plant generally contains several field devices, which are operable to implement a desired control process (e.g., oil refinery, manufacturing operation, etc.). Examples of field devices include valves, positioners, and switches, which are controlled to implement the control process.

Device descriptions are often provided by a vendor associated with a field device, with the information therein indicating various device capabilities such as the manner in which the field device may behave in different conditions, the status information (or results of execution of the management commands) can be viewed, management commands can be sent (communication to field device), etc. The device description are often provided in the form of files, for example, DD (Device Description) files, CFF (common file format) files, value files, or any other auxiliary data source pertaining to the device.

Device descriptions are generally provided according to a specification. The specifications are provided by different open standards such as Foundation Fieldbus™, HART™, etc. as is well known in the relevant arts. Even within each of such open standards, the specification is often extended over time.

The extended specifications after each such extension is referred to as a version. For example, Foundation Field Bus specification has introduced version 2.9 implying that versions 2.8, 2.0, 1.0, etc., are prior versions. Each of the CFF files in Appendix A and B contain the version information in the first few lines. The version number can be in any format, though in the described examples it is represented by two numbers N1 and N2, read as version N1.N2 (e.g., 2.8).

Parsers are often used in systems such as management stations and client systems, to parse the content of the device descriptions. Parsing generally entails examining the device description in conformance with the syntax and semantics (the keywords to be used, the grammar using which the key words are to be presented, the specific places at which users can provide values or are provided values, etc.) associated with the specific version of the open standard.

It is generally desirable that parsers be designed with a framework such that the implementation and/or deployment are simplified, particularly in view of the evolving extensions to provide backward and forward compatibility to the applicable specifications.

5. Example Process Control Environment

Figure 3:
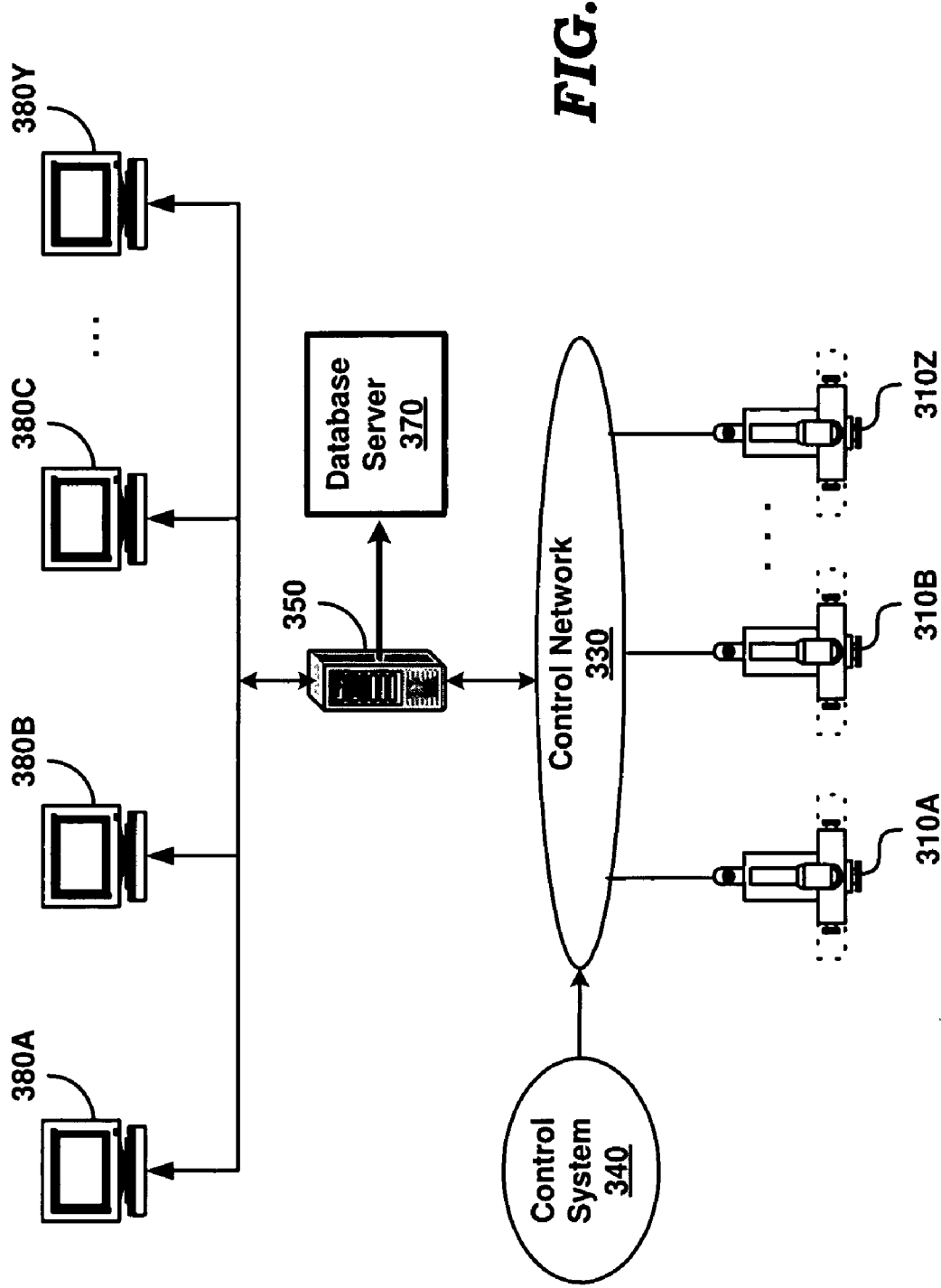
FIG. 3 is a block diagram of a process control plant illustrating an example environment in which several aspects of the present invention can be implemented.

FIG. 3 is a block diagram of a process control plant illustrating the details of an example environment in which several aspects of the present invention can be implemented. The block diagram is shown containing field devices 310A through 310Z, control network 330, control system 340, central server 350, database server 370, and client systems 380A through 380Y. Each block is described below in detail.

Control network 330 connects each of central server 350 and control system 340 with field devices 310A through 310Z. Control network 330 may contain network devices (e.g., multiplexors, modems, termination panels, etc.,) operating according to one or more protocols such as HART, Control Net, and Foundation Field Bus well known in the relevant arts.

Control system 340 issues commands to control the operation of field devices 310A through 310Z. The field devices are controlled to implement a desired control process (e.g., oil refinery, manufacturing plant). Database server 370 provides a central repository for storing information related to configuration of field devices, status of field devices, maintenance schedules, historic status/menu information, etc.

Field devices 310A through 310Z perform various operations under the control of control system 340 to implement a desired manufacturing process. In addition (or as a part of supporting such a process), each field device may be implemented to support various management commands received from central server 350. Some of the management commands may merely request information (e.g., measured pressure), and some of the commands cause the configuration to be altered (e.g., a valve might be caused to be opened).

Central server 350 receives status information from various field devices 310A through 310Z through control network 330, and makes the information available to users via client systems 380A through 380Y. Commands may be issued to the field devices to retrieve the desired information. In an embodiment, information corresponding to only the subscribed information elements is retrieved.

Client systems 380A through 380Y provides a user interface using which users may manage field devices 310A through 310Z. The user interface is often derived out of one or more formats of the device descriptions, such as DD file and/or CFF file(s).

In general, there are device descriptions related to several devices, often provided by different vendors. The description can be in different versions of the open standard as well. To provide the management features described above, it may be required to parse the device descriptions. According to an aspect of the present invention such a parser can be provided as described below with examples.

6. Client System

Figure 4:
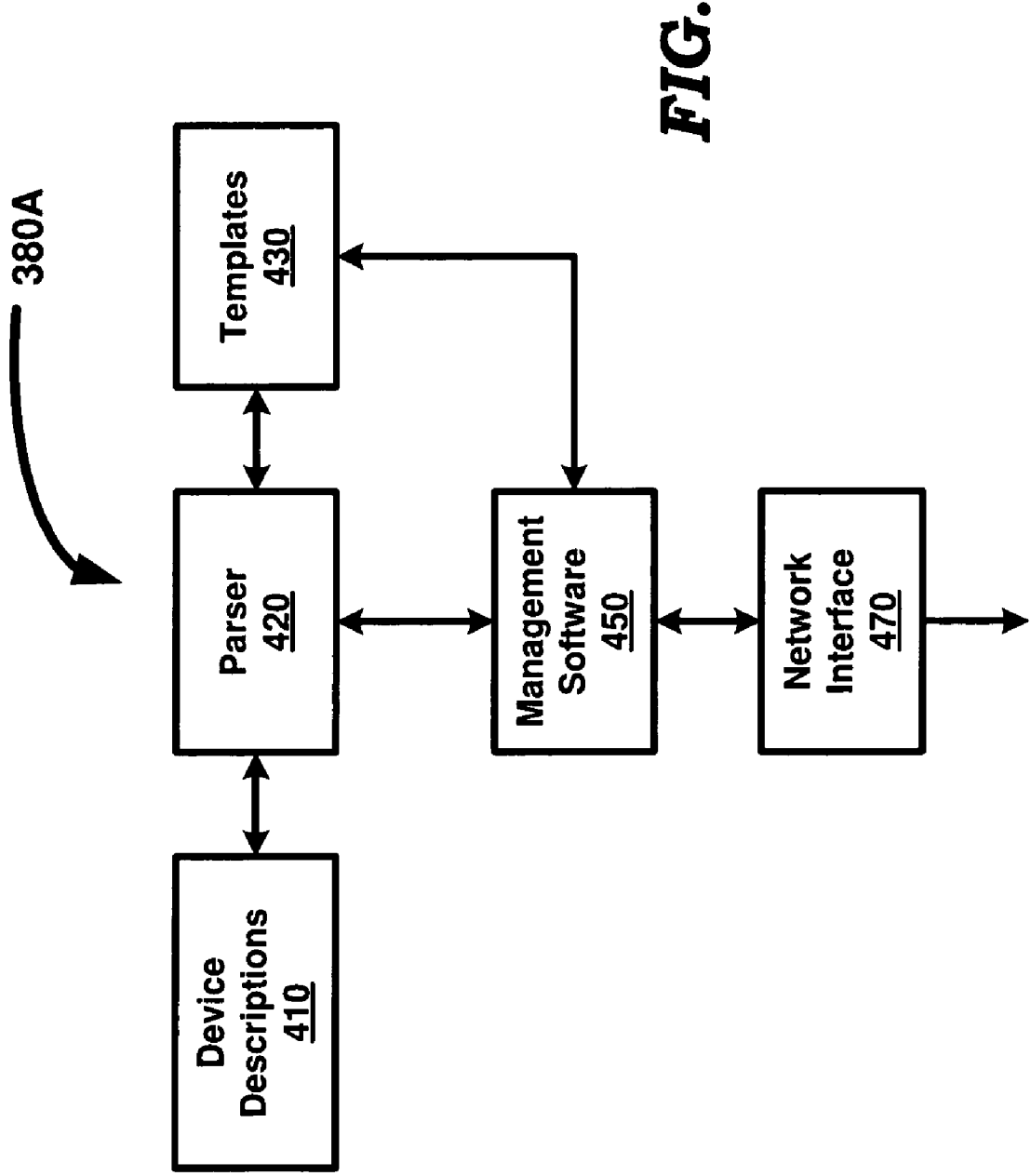
FIG. 4 is a block diagram illustrating the use of a parser in an example embodiment.

FIG. 4 is a block diagram of the details of a client system illustrating the need for a parser in one embodiment. Client system 380A is shown containing device descriptions 410, parser 420, templates 430, management software 450, and network interface 470. Each block is described below in further detail.

Though the description is provided with respect to a client system merely for illustration, it should be appreciated that the features can be implemented in other systems (e.g., central server 350) related to a process control plant as well.

Device descriptions 410 indicate the device capabilities of various devices in a process control plant. Each device description may be retrieved from an external source or stored locally in the form of files within a non-volatile memory provided in the client system. It should be understood that for the same field device type, different versions of the device description may be present since the device instances (110A-110Z) can be supporting different versions, particularly as being provided by different vendors or due to lag in upgrading the device implementations.

Network interface 470 provides the electrical/physical and protocol interfaces needed for client system 380A to communicate with central server 350 (or any other systems, for example, to retrieve device descriptions dynamically). Network interface 470 may be implemented using protocols such as TCP/IP, Ethernet, and ATM, well known in the relevant arts.

Management software 450 represents an application which enables users to manage various field devices. In general, management software 450 receives commands from users (either for information or to change configuration, usually), and forwards the commands to central server 350. The information received from central server 350, as a response, is displayed according to a suitable user interface.

Management software 450 may need the device description provided within the files noted above, to provide such management features. In an embodiment, the software uses the device descriptions data stored in the form of templates 430. Templates represent any pre-specified data structures (e.g., trees, objects), which facilitate quick/convenient retrieval of desired information of interest. These templates are created out of device descriptions.

Parser 420 provided according to various aspects of the present invention, parses the device descriptions, and stores the information contained therein, in the form of templates within database server 370. As may be appreciated, the parser may need to parse device descriptions corresponding to various versions. The specific sections (in general, portions of the entire input data to be processed) to be parsed (entire file or only specified one(s)) may be specified by management software 450 at the time of invocation.

For illustration, a small portion of the CFF file corresponding to versions 1.6 and 1.7 of Foundation Fieldbus CFF specification, for Honeywell Temperature transmitter is respectively shown in Appendix A and Appendix B.

As may be readily observed, there are common sections, which exist without changes in both the versions. In the context of CFF files, a section represents a smaller self-contained unit of information, facilitating the entire CFF files to be logically broken into smaller pieces. Each section is shown starting with a section name included between square brackets ([section name]). A section ends when a next section begins according to the convention chosen for Appendices A and B.

In addition, version 1.7 is shown as having an additional new section [SM Software Download Property]" and with modifications to the syntax of another section "[VFD 2 Function Block Type 1]".

The manner in which the software instructions for parser 420 can be designed to address such changes as suggested in the method of FIG. 3 is described below with examples. In the embodiment below, it is assumed that there are 6 versions of the open standard, merely for illustration. However, more or fewer versions can be implemented without departing from the scope and spirit of several aspects of the present invention, as will be clear to one skilled in the relevant arts.

Furthermore, though only portions of the software that relate to parser are described as being implemented using the features of the present invention, it should be appreciated that other portions (e.g., management software 450) of the software application implemented on client system 380A can also be implemented using similar approaches.

7. Parser Framework

Figure 5:
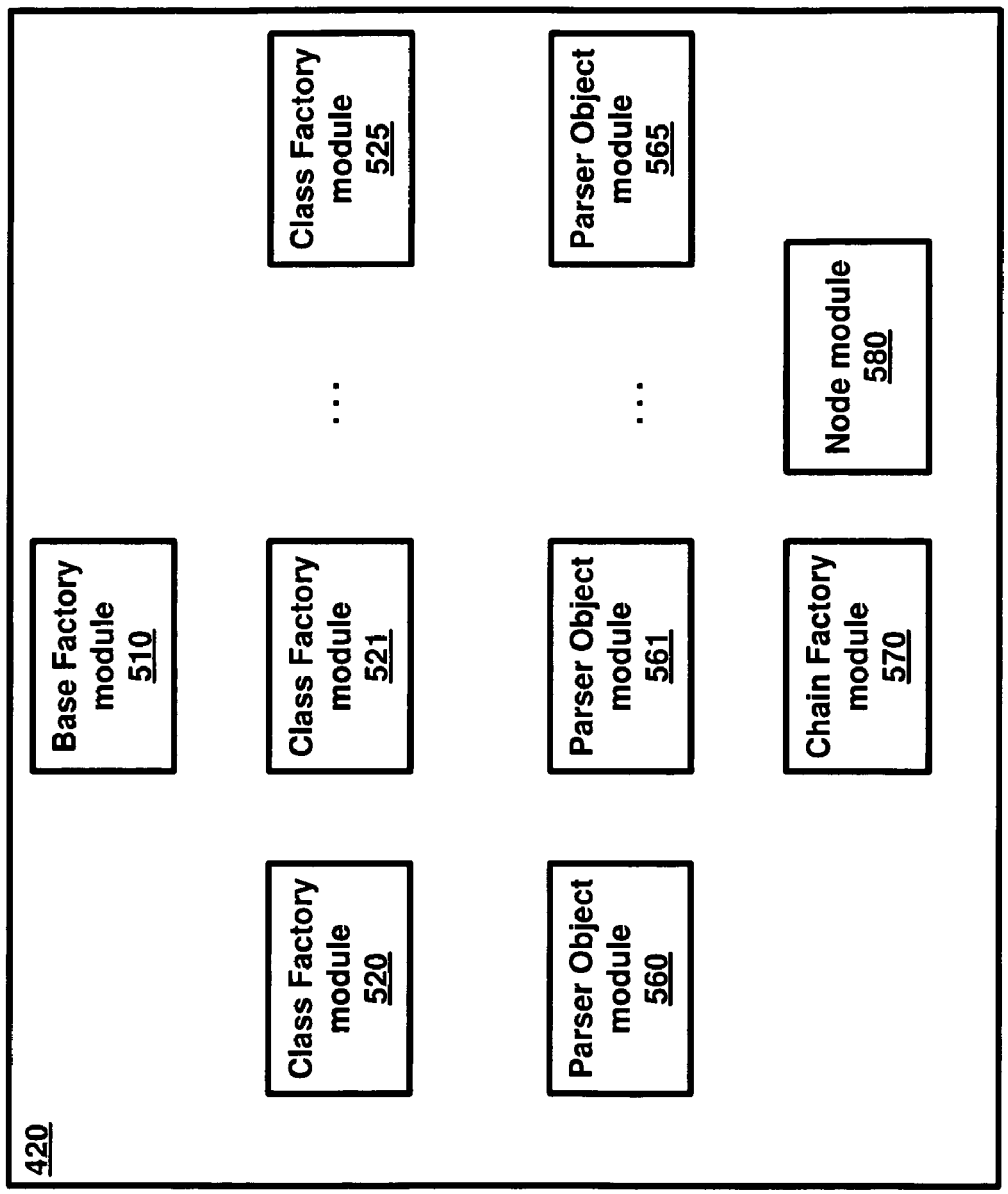
FIG. 5 is a block diagram illustrating the various modules together implementing a parser in an embodiment of the present invention.

FIG. 5 is a block diagram illustrating various code modules that may be implemented within a parser according to an aspect of the present invention. Parser 420 is shown containing base factory module 510, class factory modules 520-525, parser object modules 560-565, chain factory module 570, and node module 580. Each of the blocks is referred to as a module to represent the static software code, in contrast to instances (described in sections below) which are dynamically created and present during execution.

It should be appreciated that each module is implemented as a class and accordingly when the context permits the modules (or the corresponding instances after instantiation) are also referred to as classes in the description below. As is well known, each class may contain methods and variables (either visible only locally or to external classes), and in some instances these methods and variables can be provided external to the classes (e.g., in the main code) as well.

Also, each of the parser object modules corresponds to the version objects described above with respect to FIG. 2 above.

Furthermore, the names of the methods and classes are chosen to closely describe the function (utility) provided by the corresponding methods/classes. While only a skeleton of the program logic is provided for conciseness, it should be appreciated that the implementation of the entire program logic(s) will be apparent to one skilled in the relevant arts by reading the disclosure provided herein.

For illustration, the applicable software code for each of the modules is shown in terms of pseudo-code similar to C++ language, well known in the relevant arts. In addition the label CFF (common file format, provided by Foundation Field Bus) is shown appended to several labels merely as being directed to the corresponding format in an example embodiment.

However, several embodiments of present invention can be implemented using other languages and for other formats, without departing from the scope and spirit of the present invention, as will be apparent to one skilled in the relevant arts by reading the disclosure provided herein.

It may be observed that there is one additional class factory module (525) and parser object module (565), which are used for 'forward compatibility', described in section below. The differences of these specific modules are described there, though some of the description below is applicable to these two modules as well.

Each class factory module 520-525 is designed to create an object of a specific class (here 560-565 respectively). As is well known, different classes may have different requirements to be satisfied before their object instances are created. Each class factory module is accordingly implemented to meet such requirements.

Each class factory module 520-525 may be implemented to derive from base factory class 510, which may be implemented as follows:

```
class CFF_ClassFactory
{
  protected:
    //CFF spec version
    double CFF_Version;
    //pointer to the auto built factory chain
    static CFF_ClassFactory_Chain *m_pCFF_ClassFactoryChain;
  public:
    //Method that should be used to get the CFF_Parser which has
    //CFF version just greater than or equal to the version passed
    as argument
    static CFF_Parser* Get_CFF_Parser(double CFF_Ver);
    //Factory Method to    create instance of CFF_Parser
    virtual CFF_Parser* CreateInstance( ) = 0;
}
```

As may be observed, the base factory class provides a CreateInstance method, which would upon invocation create a parser instance and returns a pointer to the class. As indicated by '=0' above, the CreateInstance method is defined to be virtual, implying that classes deriving from the base factory class have to implement the method. The software code implementation of the CreateInstance method in the deriving classes will be apparent to one skilled in the relevant arts by reading the disclosure provided herein.

In addition, the base factory class maintains a pointer to the class factory chain used for selecting the correct parser object, as described below.

The definition (code) of class factory module 520 may be along the following lines:

```
class CFF_ClassFactory_Version1 : CFF_ClassFactory
{
  private:
    static CFF_ClassFactory_Version1
    m_CFF_ClassFactory_Version1;
  public:
    //Method that creates the CFF Parser_Version1 object
    //that supports CFF version Version 1
    virtual CFF_Parser* CreateInstance( );
}
```

It may be noted that the CreateInstance method of the class factory module provides an implementation of the method (as required by the definition noted above). Accordingly, a user can provide a desired code in the class factory module for creating the appropriate version object. As noted above, code for such methods needs to implement the specific requirements for the object sought to be instantiated.

Each of the remaining class factories 521-524 may be similarly implemented. The general relationship of the class factories with base factory is depicted in FIG. 6A, which shows that each class factory 520-524 is defined to derive from the base factory 510. It should be appreciated that each of the class factory instances is formed by instantiation of the corresponding class factory object.

Each of parser object modules 560-564 is designed to parse a corresponding version of the standard. As each version usually adds more sections and possibly modifies the syntax/semantics of some sections of a prior version, the facilities provided by Objected Oriented Languages are conveniently used and the parser object of a version is derived from the parser object of the immediate prior version as depicted in FIG. 6B.

Figure 6B:
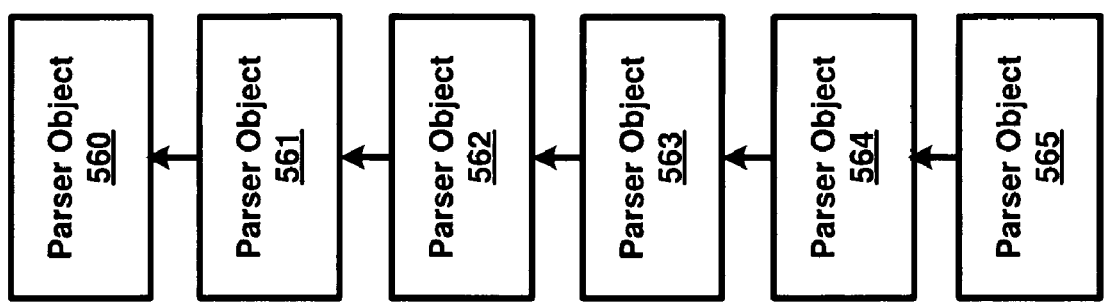
FIG. 6B is a block diagram illustrating the manner in which parser objects derive from corresponding base objects in a chain in an embodiment of the present invention.
Figure 6A:
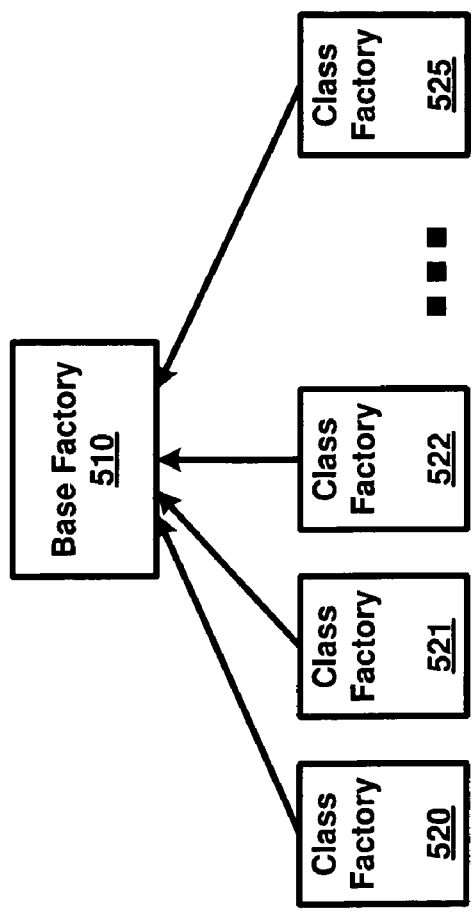
FIG. 6A is a block diagram illustrating the manner in which class factories derive from a base factory in an embodiment of the present invention.

As shown in FIG. 6B, parser objects for versions 2-5 (respectively shown as 561-565) are respectively shown defined to derive from parser object instances for versions 1-4 (560-564), where version 1 is the start version. Thus, classes of versions 1-4 would respectively be termed as (immediate) base classes for versions 2-5. This means each parser object would need to add code corresponding to the added and modified sections in the corresponding version in the base class.

In an embodiment, each of the parser objects contains a method entitled, "ProcessSection", which is implemented as follows:

```
BOOL CFFParser_2::ProcessSection (string sectionName)
{
  //First forward the call to the immediate base class
  BOOL bSuccess = CFFParser_1::ProcessSection (sectionName);
  //check if the base class could handle. If not, check if the section
  // matches any of the sections supported by this version of the object
  if( NOT bSuccess)
  {
    //Handle (handling code) modified syntaxes or new syntaxes here
  }
  return bSuccess;
}
```

The above code is assumed to be within parser object 561 and CFFParser_1 refers to the class corresponding to parser object 560 (the immediate base class). Though the parser object is shown as expressly naming the immediate base class, alternative techniques can be employed to specify the immediate base class (for example, by using a keyword), when the programming environment so permits. The load function described below, provides the sectionName in one embodiment.

The handling code generally needs to implement the program logic to parse sections, which are introduced in the current version or those that override previous versions. Thus, the handling code for version 1.7 would need to include the corresponding software instructions to parse at least the new section [SM Software Download Property]" and modified section "[VFD 2 Function Block Type 1].

In one embodiment, the program logic to parse the new section, [SM Software Download Property], noted above, may be implemented along the below lines.

```
BOOL CFFParser_2::ProcessSection (string sectionName)
{
  // sectionName here is "SM Software Download Property"
  //First forward the call to the immediate base class
  BOOL bSuccess = CFFParser_1::ProcessSection (sectionName)
  //check if the base class could handle. If not, process the section(s) here
  if( NOT bSuccess)
  {
    //Handle SM Software Download Property section here
    if (sectionName.CompareNoCase(_T("SM Software Download
                                    Property")) == 0)
    {
      //process the section variables here and set the return value as true
      bSuccess = true;
    }
    else
    {
      // I cannot handle the passed in section. I need to set the
      // return value as false so that others can take care
      bSuccess = false;
    }
  }
  return bSuccess;
}
```

The remaining parser objects 562-564 can also be similarly implemented.

In general, each section of CFF file is first passed to the immediate base class (until the base class 560 processes it). Returning of a false (failure) value from the base class implies that there was a failure to parse. Accordingly, it is assumed that the section with the sectionName is an extension compared to the version corresponding to the immediate base class or that the syntax has been modified by the current version (the two cases illustrated with Appendix A and B, in the description above), and the description of the section is parsed (handled) in the current class (parser object).

Therefore, each of the base classes is to be implemented to return a failure value when the section cannot be accurately parsed (including for the two cases illustrated in Appendix A and B). This further implies that misspelled words in a section could return an error value eventually.

Further, the above design would imply that the process section of base class 560 would always be invoked to process each section. Successive immediate base classes thereafter would return failure values until the parser object of the earliest version starts returning a true value as a success indication (bSuccess=true).

For illustration, it is assumed that version 3 is designed to accurately parse a section and the parser object for version 6 (since the CFF file is of version 6) has been requested to parse that section. Parser object 6 would invoke parser object 5, which would invoke parser object 4, etc., and the ProcessSection method of parser object 1 (absolute base) would be eventually invoked. Parser object 1 would return failure, which would cause parser object 2 to also handle and thereafter return a failure value. The handling code of parser object 3 would return a true value since the handling code of parser object 3 is designed to successfully parse the section. Parser objects 4 and 5 would then return true value as well, indicating a successful parsing.

From the above, it may be appreciated that it is generally sufficient to instantiate the parser object corresponding to the version in the CFF file. Chain factory module 570 and node module 580 may be used for such a purpose and is accordingly described below.

8. Selecting the Parser Object to Process a Section

Broadly, Chain Factory module 570 contains the data structures and methods to create nodes, with each node pointing to the corresponding one of the class factory instances 520-524. Each node may also contain pointers to maintain a linked list of the class factory instances. The linked list is searched to determine the appropriate class factory, which instantiates the corresponding parser object as described below with examples.

In an embodiment, each node is implemented along the following lines:

```
class Class_Factory_Chain_Node
{
  public:
    //actual object
    CFF_ClassFactory* pCFF_ClassFactory;
    //links in the chain
    Class_Factory_Chain_Node * pNextNode;
    Class_Factory_Chain_Node * pPrevNode;
    Class_Factory_Chain_Node
       (CFF_ClassFactory * pCFF_ClassFactory);
}
```

As may be appreciated, the variables pNextNode and pPrevNode store pointers to the next and previous nodes in the chain. Each node is initialized by invocation of the method Class_Factory_Chain_Node passing a pointer to the class factory instance as the parameter.

On the other hand, the program logic for the chain factory module may be along the below lines:

```
class Class_Factory_Chain
{
  protected:
    Class_Factory_Chain_Node * m_pChainHeader; //Header node
  public:
    //Method to add a node to the chain
    void AddToChain(CFF_ClassFactory * pNewCFFFactory);
    //Method to get the first node in the chain that is
    //just greater than or equal to the version
    virtual Class_Factory_Chain* GetApplicabieNode(double
       CFF_Ver);
    //Method to get the last node in the chain
    //This node contains the highest version
    Class_Factory_Chain_Node* GetLastNode( );
}
```

As can be appreciated from the above, the Class_Factory_Chain object exposes methods to add a node to the chain, to get the first node in the chain or the last node in the chain. The AddToChain method is used to create the factory chain (described below).

In one embodiment, the AddToChain function is implemented along the following lines:

```
void Class_Factory_Chain::AddToChain(CFF_ClassFactory *
pNewCFFFactory)
{
   Class_Factory_Chain_Node *pNewNode =
                      new Class_Factory_Chain_Node
                           (pNewCFFFactory);
   Class_Factory_Chain_Node * pHeaderTemp = m_pChainHeader;
   //first node
   if(pHeaderTemp->pNextNode == NULL)
   {
      pHeaderTemp->pNextNode = pNewNode;
      pNewNode->pPrevNode = pHeaderTemp;
   }
   else
   {
      //insert in the list according to the increasing order of versions
      supported while(pHeaderTemp->pNextNode != NULL)
      {
         Class_Factory_Chain_Node *pNodeInChain =
                           pHeaderTemp->pNextNode;
         //check the version of resource
         if( nNewNodeVer < nNodeVerInChain)
         {
            //insert before the node
            pNewNode->pPrevNode = pNodeInChain->pPrevNode;
            pNewNode->pNextNode = pNodeInChain;
            pNodeInChain->pPrevNode = pNewNode;
            break;
         }
         else if(nNewNodeVer == nNodeVerInChain)
         {
            //same version, skip
            break;
         }
         else
         {
            pHeaderTemp = pHeaderTemp->pNextNode;
         }
      }
      //reached end
      if(pHeaderTemp->pNextNode == NULL)
      {
         pHeaderTemp->pNextNode = pNewNode;
```

-continued

```
        pNewNode->pPrevNode = pHeaderTemp;
      }
    }
}
```

Using the program logics (framework) thus implemented, the manner in which the parser may operate when the software instructions of the parser are executed, is described next.

9. Details During Operation

Figure 7:
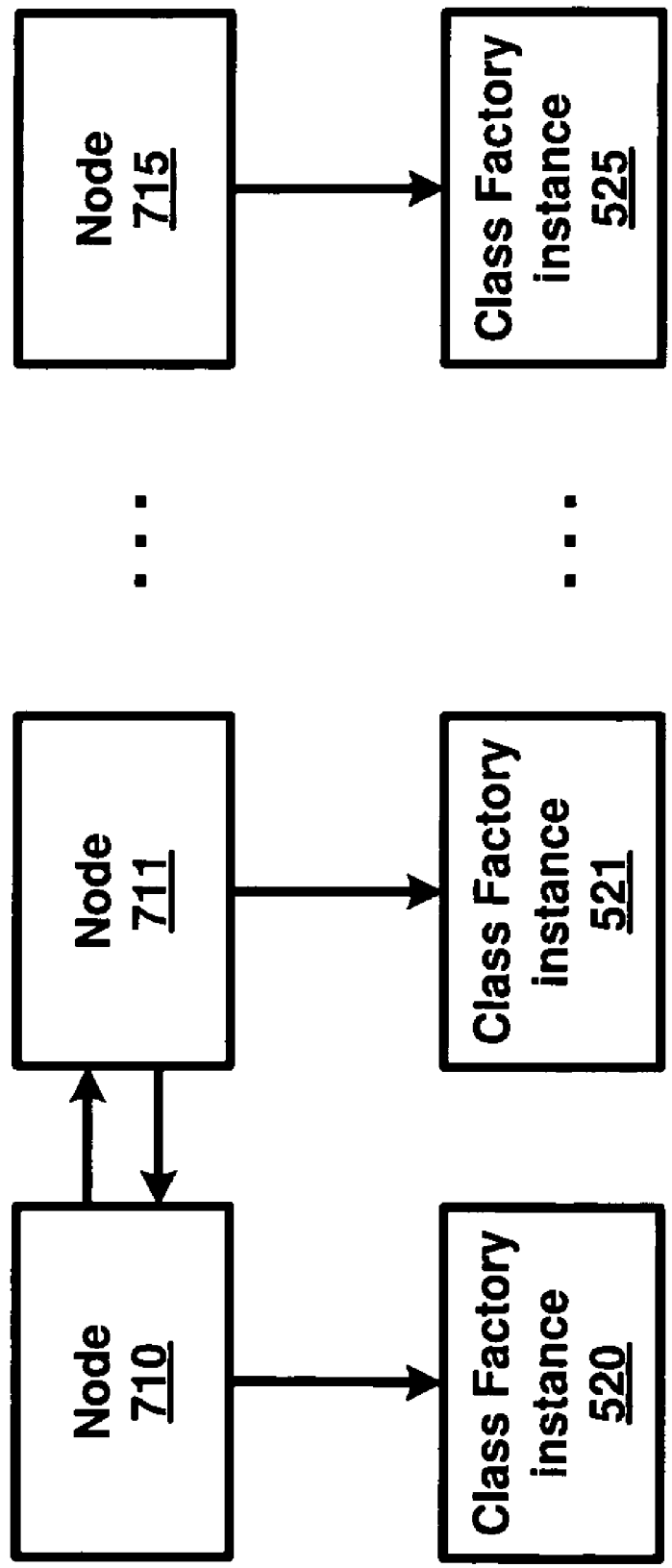
FIG. 7 is a block diagram illustrating the details of a chain factory formed in an embodiment of the present invention.

Thus, when the instructions implementing the parser are executed, the sequence of operations in an embodiment is described below. The class factories may be instantiated. A linked list of the factories is thereafter (in ascending order according to version numbers/information) created using the nodes noted above, and the corresponding scenario is depicted in FIG. 7.

A node is shown created for each of the class factories as a result. pNextNode and pPrevnode variables noted above would store the pointers to next node and previous node. The pNextNode for the last node 715 may store NULL value to indicate the end of the chain.

In general, the chain may be initialized to null and each of the versions may be added as corresponding nodes to the chain. The corresponding program may be implemented along the below lines:

```
// This is where the class factory chain is initialized.
Class_Factory_Chain* CFF_ClassFactory::m_pCFF_ClassFactory
Chain = NULL;
//This is the place where the class factory object's constructor
// will be called where the objects are added to the class factory chain.
CFF_ClassFactory_Version1    m_CFF_ClassFactory_Version1;
CFF_ClassFactory_Version2    m_CFF_ClassFactory_Version2;
//append to this list when new versions need to be incorporated
```

In one embodiment, the constructor of CFF_ClassFactory_Version1 may be implemented along the below logic:

```
CFF_ClassFactory_Version1 :: CFF_ClassFactory_Version1 ( )
{
    CFF_Version = 1.0;
    CFF_ClassFactory_Version1::m_pCFF_ClassFactoryChain ->
    AddToChain(this);
}
```

The specific CFF file, one of the device descriptions 410, is then examined to determine the version number. The parser object suitable to parse the CFF file of the version number is then determined as follows.

In an embodiment, the specific one of the parser object suited to process the device description, is instantiated as follows:
m_pCFF_Version=CFF_ClassFactory::Get_CFF_Parser (CffVersion);

In general, the program logic for Get_CFF_Parser method needs to be designed to examine the version information in the factory chain of FIG. 7, determine the appropriate one of the parser objects that is to be instantiated, and instantiate that parser object. The implementation of Get_CFF_Parser method will be apparent to one skilled in the relevant arts by reading the disclosure provided herein.

From the above, it may be appreciated that Get_CFF_Parser traverses the nodes of FIG. 7 to determine the class factory corresponding to the parser object which can parse a version equal to or greater than the value represented by CFF_Version passed as the parameter. The method CreateInstance( ) provided within that class factory is invoked to instantiate the corresponding parser object. A pointer to the instantiated parser object is then returned as the result of execution of the function Get_CFF_Parser( ).

In the description above, it may be appreciated that the version information and the input data (i.e., various sections of the device description) are received separately. However, in alternative embodiments (e.g., while processing packets related to network communications), the input data and the version information may be received together.

The CFF file is thereafter examined to identify each section, and the section is parsed. In one embodiment, we can consider that a method/function like Load, described below would iterate over the list of sections in the device description and initiates the processing:

```
BOOL CFF_Parser::Load(string strCFF_File)
{
    while (bSuccess && !EndOfFile)
    {
        //Identify a new section based on [ ]
        string strSection = GetNextSection_From_CFF_File(strCFF_File);
        //process the new section
        bSuccess = ProcessSection(strSection );
    }
}
```

Thus, using the basic framework of above, additional versions can easily be incorporated. Before describing the manner in which parsing of additional versions can be incorporated into the parser provided according to various aspects of the present invention, the description is continued with respect to the manner in which the parser is designed to tolerate new versions (for which parser objects may not yet be provided) according to an aspect of the present invention.

10. Tolerance to New Versions not Yet Supported

According to an aspect of the present invention, parser 420 is implemented to be tolerant to the newer versions of the CFF specification for which the parser objects noted above are not yet implemented. In other words, in such a situation, the specific sections which override the previous versions or new sections would not yet be supported. It is generally desirable that such changes are handled gracefully.

In an embodiment, parser object module 565 is implemented to indicate as supporting the highest version number (say version 1000, whereas other versions are of the magnitude of single digit).

Assuming hypothetically that parser object module 564 supports version 2.8, and then a request is received to parse a CFF file of version 2.9, the class factory 525 would be selected and parser object 565 would be instantiated by Get_CFF_Parser( ).

The handling code of parser object 565 may be implemented as follows (assuming that the parser object class is named as CCFF_MaxVersion and its base class is named as My_Immediate_Base):

```
BOOL CCFF_MaxVersion::ProcessSection(string sectionName)
{
  BOOL bSuccess =
  My_Immediate_Base::ProcessSection(sectionName);
  if(NOT bSuccess)
  {
    //tolerate the new or modified section by skipping the section and
    its contents
    //SkipSection is a helper function to skip a section's content
    SkipSection(sectionName);
    bSuccess = TRUE;
  }
  return bSuccess;
}
```

It may be observed that parser object 565 is instantiated in all circumstances in which a version is not presently supported. The sections which are supported by the previous versions would be parsed by the code in the base objects, while the handling code of parser object 565 would process the new sections and the sections that would override the definitions in previous sections.

From the above, it should be appreciated that the new sections can always be ignored providing tolerance or an appropriate error code returned to the requester. For example, assuming only (up to) version 1.6 of Appendix A is supported, the handling code of parser object 565 would be operative when sections "[SM Software Download Property]" and "[VFD 2 Function Block Type 1]" are encountered.

The description is now continued with respect to the manner in which the software of above can be extended to support new versions.

11. Adding Code to Support New Versions

Figure 8:
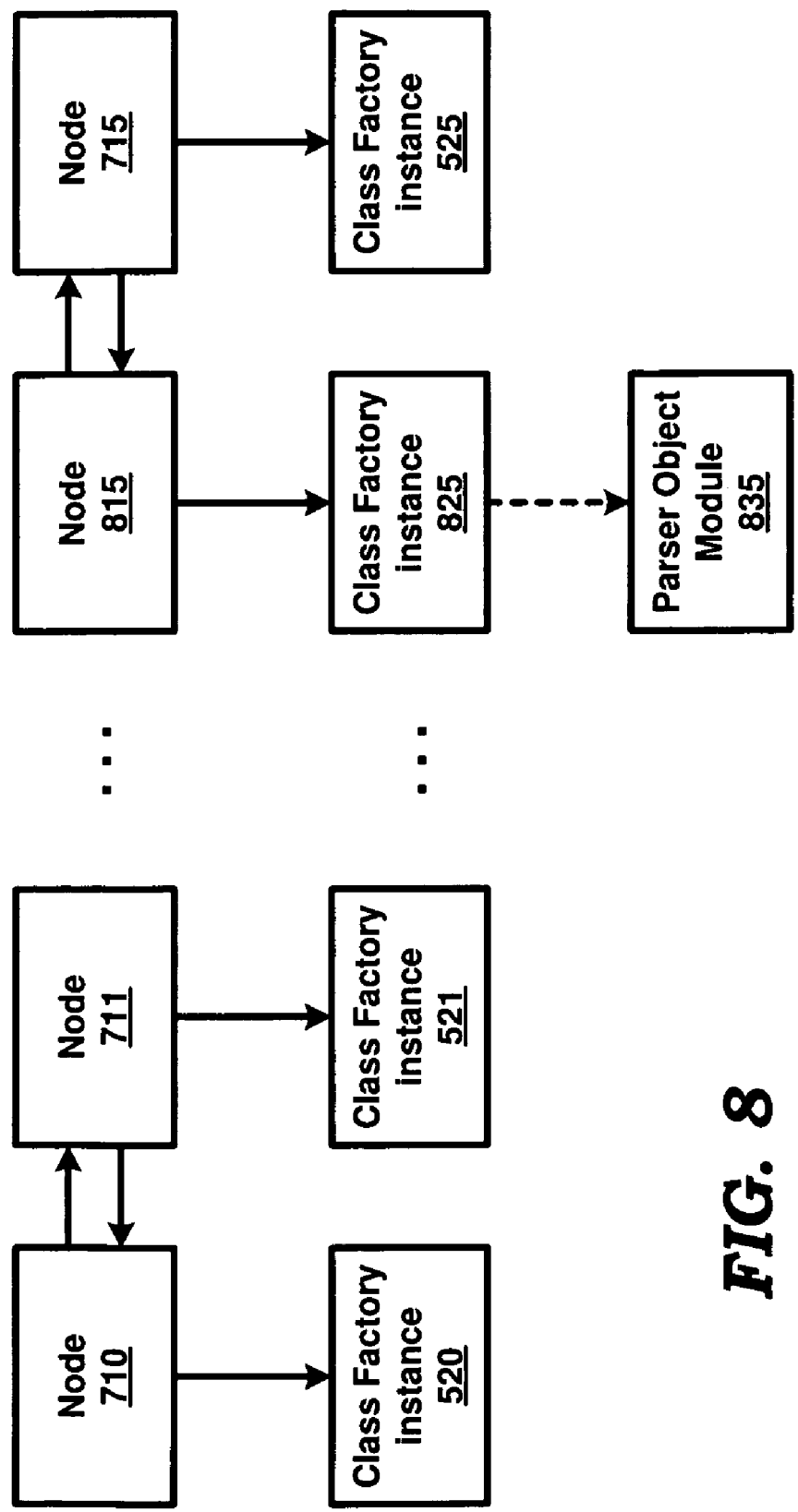
FIG. 8 is a block diagram illustrating the chain factory when a new version is added in an embodiment of the present invention.

It is now assumed that parser object 564 corresponds to version 1.6 (Appendix A) and it is desirable to upgrade the parser to add support for version 1.7 (Appendix B). Once supported, parser object 565 would not be instantiated to parse the corresponding CFF version, as described below in further detail with respect to FIG. 8. For conciseness, only the differences with respect to FIGS. 5, 6A, 6B and 7 are described below.

A new parser object 835 may be implemented with the handling code to process sections "[SM Software Download Property]" and "[VFD 2 Function Block Type 1]". The implementation of this code can be performed in a known way. The object module would be included in the code of FIG. 5. The factory module 825, which would instantiate parser object 835 is also included in the code of FIG. 5. Factory module 825 would derive from base factory 510, as with other modules. Parser object 835 would derive from parser object 564, while parser object 565 would derive from parser object 835.

A node 815 is created (in the main code, not shown) for factory object 825 and is placed between nodes 714 and 715 by using the appropriate pointers in the chain.

Once the software instructions are designed and implemented as above, the parser would support version 1.7 as well. In addition, for changes introduced by versions 1.8 and thereafter, parser object 565 would continue to process the corresponding sections.

The addition of support for new versions is therefore simplified. In addition, the parser is more tolerant to changes introduced by the future versions.

It should be further appreciated that the features described above can be implemented in various digital processing systems. Though some of the features are described as being operative upon execution of appropriate software instructions, alternative embodiments can be implemented with each block (e.g., the steps of FIG. 2, the blocks of FIGS. 4-8) made from circuits such as specialized integrated circuits, FPGAs, etc.

12. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

APPENDIX A

```
//
//     Honeywell ST3000 Capabilities Files
//
//     Copyright 2000, Honeywell International.
//
// ========================
// File Header
// ========================
[File Header]
Description = "STT35F Temperature Transmitter Capabilities File"  // Description of this file
FileType = CapabilitiesFile      // must equal this exact string
FileDate = 2003,12,17        // yyyy,mm,dd order must be used
CffVersion = 1,6
// ========================
// Device Header
// ========================
[Device Header]
DeviceName = "Temperature Transmitter"     // Not actually present in the device?
CommGroup = 3
```

APPENDIX A-continued

```
CommClass = Class31+Class32 // Class32 was omitted in earlier versions, but has always
applied
CommSubClass = Class3Publisher+Class3Subscriber+Class3LinkMaster
DeviceClass = 2        // Link Master
// =========================
// Management VFD
// =========================
[Device VFD 1]
VendorName = "Softing"
ModelName = "FD_MIB"
Revision = "1.51"
VersionOD = 1
ProfileNumber = 0x4D47        // defined in SM spec
// =========================
// Function Block VFD
// =========================
[Device VFD 2]
VendorName = "Honeywell"
ModelName = "STT35F"
Revision = "Rev 4.04"
VersionOD = 0x02
ProfileNumber = 0
// =========================
// Network Management Section
// =========================
[NM OD Directory]
// Object 257
// Header
DirectoryRevisionNumber=1
NumberOfDirectoryObjects=1
TotalNumberOfDirectoryEntries=8
DirectoryIndexOfFirstCompositeListReference=9
NumberOfCompositeListReferences=1
// Composite Object References
StackMgtOdIndex=290
NumberOfObjectsInStackManagement= 1
VcrListOdIndex = 291
NumberOfObjectsInVcrList=36
DlmeBasicOdIndex = 330
NumberOfObjectsInDllBasic=2
DlmeLinkMasterOdIndex = 332
NumberOfObjectsInDllLme=8
LinkScheduleListOdIndex = 343
NumberOfObjectsInDllLinkSchedule =6
DlmeBridgeOdIndex = 0        // Not used in ST35F
NumberOfObjectsInDllBridge = 0
PlmeBasicOdIndex = 340
NumberOfObjectsInPhyLme = 3
ListOfMmeReferences = 9
NumberOfMmeComposites = 0
[NM Restrictions] // Communication Capability
MaximumResponseDelaySlotTime = 50 // Slowest time it takes the device to respond
(octets)
MinimumInterPduDelay = 4        // Minimum time the device needs between messages
(octets)
SlotTime = 5            // Minimum ???
// Stack Capabilities
FasArTypesAndRolesSupported   =   QUB_SERVER+QUU_SOURCE+BNU_PUBLISHER
+BNU_SUBSCRIBER
MaxDlsapAddressSupported = 16
MaxDlcepAddressSupported = 17
DlcepDeliveryFeaturesSupported = 0xBB
VersionOfNmSpecSupported = 0x103     // Should this change ???
AgentFunctionsSupported = 0x07
FmsFeaturesSupported     =     INFO_REPORT+EVENT,GET_OD+READ+WRITE+
INFO_REPORT+ACK_EVENT+GEN_DOWNLOAD
// Basic Characteristics
Version = 1
BasicStatisticsSupportedFlag = 0
DlDeviceConformance = 0x20010365
DlOperatFunctionalClass = 2
//   VCR Information
MaxEntries = 16
NumPermanentEntries = 1
DynamicsSupportedFlag = TRUE
StatisticsSupported = FALSE
// Ref code system.h
// The following 6 values reflect the VCR capabilities, but are not available
// as parameters in the MIB.
MaximumNumberOfClientVcrs = 0
```

APPENDIX A-continued

```
MaximumNumberOfServerVcrs = 15 // MAX_NO_OF_USR_VCR
MaximumNumberOfSourceVcrs = 15 // MAX_NO_OF_USR_VCR
MaximumNumberOfSinkVcrs = 0
MaximumNumberOfSubscriberVcrs = 15 // MAX_NO_OF_USR_VCR
MaximumNumberOfPublisherVcrs =15 // MAX_NO_OF_USR_VCR
// Scheduling information
MaximumSchedulingOverhead = 4
DlmeLinkMasterCapabilitiesVariable = 0x04
NumOfSchedules = 2
NumOfSubSchedulesPerSchedule = 1
// Ref code system.h
// The following 3 elements are checked by the Product when schedules are downloaded
// However, they are not available as parameters in the MIB
// All 3 of these are maximum allowable values.
NumOfSequencesPerSubSchedule = 10 //MAX_N_SEQ
NumOfElementsPerSequence = 4 // MAX_N_SEQ_ELEMS
MaximumSingleLasScheduleSize = 120 // MAX_LAS_CFG
//---------------------------------------------
// Physical Layer
//---------------------------------------------
PowerRequired = 22 // in milliamps
ChannelStatisticsSupported = 0x0
MediumAndDataRatesSupported = 0x0000000000000049
//WIRE_MEDIUM+VOLTAGE_MODE+SPEED_31KBPS
IecVersion = 0x0001 // 31.25 half duplex
NumberOfChannels =1
PowerMode = BUS_POWERED
InterfaceMode = HALF_DUPLEX
// ========================
[Server Restrictions]
// Reference function falvcr_check_feat_and_ctr( ) - falvcr.c
FmsMaxOutstandingServicesCalling = 0
FmsMaxOutstandingServicesCalled = 1
// ========================
[NM VCR Usage 1]
// For partially configurable VCRs, the host configuration device must remember
// which attributes of the VCR are configurable. The fully configurable VCRs are not listed here.
// Permanent Management VCR
FasArTypeAndRole = QUB+SERVER+NOBYPASS
FasDllLocalAddr = 0xF8
FasDllConfiguredRemoteAddr = FREE
FasDllSDAP                             =
NONSCHEDULED+DISORDERED+AUTH_SOURCE+TIMEAVAILABLE
FasDllMaxConfirmDelayOnConnect = 60000
FasDllMaxConfirmDelayOnData = 60000
FasDllMaxDlsduSize = 128
FasDllResidualActivitySupported = RESIDUAL
FasDllTimelinessClass = NONE+NODUPLICATION+NONE
FasDllPublisherTimeWindowSize = 0
FasDllPublisherSynchronizingDlcep = 0
FasDllSubscriberTimeWindowSize = 0
FasDllSubscriberSynchronizingDlcep = 0
FmsVfdID = 1
FmsMaxOutstandingServicesCalling = 0
FmsMaxOutstandingServicesCalled = 1
FmsFeaturesSupported = NONE, GET_OD+READ+WRITE+GEN_DOWNLOAD
// Other VCRs are fully configurable.
// = = = = = = = = = = = = = = = = =
// SM section
// = = = = = = = = = = = = = = = = =
[SM OD Directory]
DirectoryRevisionNumber =1
NumberOfDirectoryObjects =1
TotalNumberOfDirectoryEntries =5
DirectoryIndexOfFirstCompositeListReference =0
NumberOfCompositeListReference =0
SmAgentStartingOdIndex =258
NumberOfSmAgentObjects =4
SyncAndSchedulingStartingOdIndex =262
NumberOfSyncAndSchedulingObjects =8
AddressAssignmentStartingOdIndex =270
NumberOfAddressAssignmentObjects =3
VfdListStartingOdIndex =273
NumberOfVfdListObjects =2
FbScheduleStartingOdIndex =275 // From Parm dict. was 276
NumberOfFbScheduleObjects =5
// = = = = = = = = = = = = = = = = =
//    SM VFD
// = = = = = = = = = = = = = = = = =
```

APPENDIX A-continued

```
[SM VFD 1]
VFD_REF =0x1
VFD_TAG = "MIB_VFD"
[SM VFD 2]
VFD_REF =0x2
VFD_TAG = "FBAP"
// = = = = = = = = = = = = = = = = =
//    SM Capability
// = = = = = = = = = = = = = = = = =
[SM Capability]
Sm_Support  =  SET_PDTAG_AGENT+SET_ADDR_AGENT+CLR_ADDR_AGENT+
IDENTIFY_AGENT+LOC_FB_AGENT\+FMS_SERVER+TIME_SLAVE+SCHEDULE_FB
// = = = = = = = = = = = = = = = = =
// Function Block Application VFD
// = = = = = = = = = = = = = = = = =
[VFD 2 OD Directory]
DirectoryRevisionNumber =2
NumberOfDirectoryObjects =1
TotalNumberOfDirectoryEntries =12
DirectoryIndexOfFirstCompositeListReference =17
NumberOfCompositeListReference =3
OdIndexForStartingActionObject =0
NumberOfActionObjects =0
OdIndexOfTheStartingLinkObjectInTheVfd =561
NumberOfLinkObjectsInTheVfd =14
OdIndexOfTheStartingAlertObjectInTheVfd =551
NumberOfAlertObjectsInTheVfd =3
OdIndexOfTheStartingTrendObjectInTheVfd =556
NumberOfTrendObjectsInTheVfd =2
OdIndexOfTheStartingDomainObjectInTheVfd =550
NumberOfDomainObjectsInTheVfd =1
DirectoryIndexForTheResourceBlock =23
NumberOfResourceBlocksInTheVfd =1
DirectoryIndexForTheFirstTransducerBlockPointer =25
NumberOfTransducerBlocksInTheVfd =1
DirectoryIndexForTheFirstFunctionBlockPointer =27
NumberOfFunctionBlocksInTheVfd =2
// = = = = = = = = = = = = = = = = =
//    Channels for I/O
// = = = = = = = = = = = = = = = = =
[VFD 2 Channels]
Channel1 = "Sensor Temperature"
// = = = = = = = = = = = = = = = = =
//      Resource Block
// = = = = = = = = = = = = = = = = =
[VFD 2 Resource Block]
//Block_Type =RESOURCE      //removed in version 1.5
Block_Index =400
DD_Item =0x80020af0 //Resource block 2 with ITK_VER
Profile =0x0133
Profile_Revision =0x0101
Num_Of_Parms = 51
Views_Index = 588
Number_View_3 = 1
Number_View_4 = 1
[VFD 2 Resource Block Defaults]
// Minimum Resource Block Defaults required
// All writeable parameters after Restart-Defaults
ST_REV = 0
TAG_DESC                                                               =
0x20202020202020202020202020202020202020202020202020202020202020
STRATEGY = 0
ALERT_KEY = 0
MODE_BLK = 0x01, 0x01, 0x11, 0x10 // O/S, O/S, O/S|Auto, Auto
DD_RESOURCE = ""
MANUFAC_ID =0x48574C
DEV_TYPE =0x0101
DEV_REV =0x04
DD_REV =0x01
GRANT_DENY = 0x00, 0x00
HARD_TYPES = 0x8000
RESTART = 1 // Run
FEATURES =0x4800 // Reports | Hard W Lock
FEATURE_SEL =0x4000 // Reports
CYCLE_TYPE =0x8000
CYCLE_SEL = 0x0000
MIN_CYCLE_T =4000 // 125 msec
MEMORY_SIZE =0
NV_CYCLE_T =28800000 // 15 Minutes
SHED_RCAS = 640000 // 20 sec
```

APPENDIX A-continued

```
SHED_ROUT = 640000 // 20 sec
FAULT_STATE = 1 // Clear
SET_FSTATE = 1 // OFF
CLR_FSTATE = 1 // OFF
MAX_NOTIFY =8
LIM_NOTIFY = 8
CONFIRM_TIME = 640000 // 20 sec
WRITE_LOCK = 1 // not locked
//ALARM_SUM = 0x0100, 0x0000, 0x0000, 0x0000 //Jim rem'd this out on LX
ACK_OPTION = 0x0000
WRITE_PRI = 0
ITK_VER =4
// Manufacturer's specific parameters
DL_CMD1 = 0
DL_CMD2 = 0
AUX_FEATURES = 0x0000
[VFD 2 Resource Block Example Values]
// = = = = = = = = = = = = = = = = =
//      Transducer Block
// = = = = = = = = = = = = = = = = =
[VFD 2 Transducer Block 1]
//Block_Type = TRANSDUCER     //removed in version 1.5
Block_Index =470
DD_Item =0x20000
Profile =0x8001 // custom TB
Profile_Revision = 0
Num_Of_Parms =34
Views_Index =592
Number_View_3 =1
Number_View_4 =1
[VFD 2 Transducer Block 1 Defaults]
ST_REV = 0
TAG_DESC                                                               =
0x20202020202020202020202020202020202020202020202020202020202020202020
STRATEGY = 0
ALERT_KEY = 0
MODE_BLK = 0x01, 0x01, 0x11, 0x10 // O/S, O/S, O/S|Auto, Auto Block in O/S to allow
restricted writes.
//ALARM_SUM = 0x0100, 0x0000, 0x0000, 0x0000
// Manufacturer's specific parameters
XD_DIAGNOSTICS = 0 // No specific problem
PV_UNITS = 1243 //mV
CJT_EXTERNAL = 0
CJT_UNITS = 1001 // deg C
CJT_TYPE = 1 // Internal Cold Junction
SENSOR_TYPE = 103 // mV
SENSOR_CONF = 3 // Single sensor wired
BREAK_DETECT = 2 // Sensor fault detection ENABLED
LATCHING = 1 // Latching DISABLED
POWER_FILTER = 1 // 50 Hz
EMISSIVITY = 10
[VFD 2 Transducer Block 1 Example Values]
// = = = = = = = = = = = = = = = = =
//      AI Function Block
// = = = = = = = = = = = = = = = = =
[VFD 2 Function Block 1]
//Block_Type =AI //removed in version 1.5
Block_Index =257
DD_Item =0x800201D0
Profile =0x0101 //standard AI block
Profile_Revision =0x0101 // <DD_REV>01
Execution_Time =736
Num_Of_Parms =39
Views_Index =580
Number_View_3 =1
Number_View_4 =1
[VFD 2 Function Block 1 Defaults]
ST_REV = 0
TAG_DESC                                                               =
0x20202020202020202020202020202020202020202020202020202020202020202020
STRATEGY = 0
ALERT_KEY = 0 // Causes Block Configuration Error
//MODE_BLK = 0x80, 0x80, 0x98, 0x08 // O/S, O/S, Auto | Man | O/S, Auto
MODE_BLK = 0x01, 0x01, 0x19, 0x10 // O/S, O/S, Auto | Man | O/S, Auto
//BLOCK_ERR = 0x8002 // Out of Service | BlockConfiguration
OUT = 0x1d, 0
SIMULATE = 0x0, 0, 0x0, 0, 1 // partially dependent on XD block - disabled
XD_SCALE = 100, 0, 1001, 0 // Should match XD.PRIMARY_VALUE_RANGE
OUT_SCALE = 100, 0, 1147, 0
GRANT_DENY = 0x00, 0x00
```

APPENDIX A-continued

```
IO_OPTS = 0x0000
STATUS_OPTS = 0x0000
CHANNEL = 0 // Causes Block Configuration Error
L_TYPE = 0 // Causes Block Configuration Error
LOW_CUT = 0
PV_FTIME = 0
//ALARM_SUM = 0x0080, 0x0000, 0x0000, 0x0000
ACK_OPTION = 0x0000
ALARM_HYS = 0.5
HI_HI_PRI = 0x00
HI_HI_LIM = +INF
HI_PRI = 0x00
HI_LIM = +INF
LO_PRI = 0x00
LO_LIM = -INF
LO_LO_PRI = 0x00
LO_LO_LIM = -INF
// Manufacturer's specific parameters
[VFD 2 Function Block 1 Example Values]
// = = = = = = = = = = = = = = = = =
//      PID Function Block
// = = = = = = = = = = = = = = = = =
[VFD 2 Function Block 2]
//Block_Type = PID      //removed in version 1.5
Block_Index =310
DD_Item =0x800202B0
Profile =0x0108 //standard PID block
Profile_Revision =0x0101 // <DD_REV>01
Execution_Time =2880
Num_Of_Parms =74
Views_Index =584
Number_View_3 =1
Number_View_4 =1
[VFD 2 Function Block 2 Defaults]
ST_REV = 0
TAG_DESC                                                    =
0x20202020202020202020202020202020202020202020202020202020202020
STRATEGY = 0
ALERT_KEY = 0
//MODE_BLK = 0x80, 0x80, 0x9f, 0x08 // O/S, O/S, ROut | RCas | Cas | Auto | Man | O/S,
Auto
MODE_BLK = 0x01, 0x01, 0xf9, 0x10 // O/S, O/S, ROut | RCas | Cas | Auto | Man | O/S,
Auto
//BLOCK_ERR = 0x8002 // Out of Service | BlockConfiguration
//BLOCK_ERR = 0x4001 // Out of Service | BlockConfiguration
SP = 0x1c, 0
OUT = 0x1d, 0
PV_SCALE = 100, 0, 0, 0
OUT_SCALE = 100, 0, 0, 0
GRANT_DENY = 0x00, 0x00
CONTROL_OPTS = 0x0000
STATUS_OPTS = 0x0000
PV_FTIME = 0
BYPASS = 0 // Causes Block Configuration Error
SP_RATE_DN = +INF
SP_RATE_UP = +INF
SP_HI_LIM = 100
SP_LO_LIM = 0
GAIN = 0
RESET = +INF
BAL_TIME = 0
RATE = 0
OUT_HI_LIM = 100
OUT_LO_LIM = 0
BKCAL_HYS = 0.5
SHED_OPT = 0 // Causes Block Configuration Error
TRK_SCALE = 100, 0, 0, 0
FF_SCALE = 100, 0, 0, 0
FF_GAIN = 0
//ALARM_SUM = 0x0080, 0x0000, 0x0000, 0x0000
ACK_OPTION = 0x0000
ALARM_HYS = 0.5
HI_HI_PRI = 0x00
HI_HI_LIM = +INF
HI_PRI = 0x00
HI_LIM = +INF
LO_PRI = 0x00
LO_LIM = -INF
LO_LO_PRI = 0x00
LO_LO_LIM = -INF
```

APPENDIX A-continued

```
DV_HI_PRI = 0x00
DV_HI_LIM = +INF
DV_LO_PRI = 0x00
DV_LO_LIM = -INF
// Manufacturer's specific parameters
PID_FORM = 1
ALGO_TYPE = 1
OUT_LAG = 0
GAIN_NLIN = 0
[VFD 2 Function Block 2 Example Values]
```

APPENDIX B

```
//
//      Honeywell STT35F Capabilities Files
//
//      Copyright 2004, Honeywell International.
//
// ========================
// File Header
// ========================
[File Header]
Description = "STT35F Temperature Transmitter Capabilities File" // Description of this file
FileType = CapabilitiesFile    // must equal this exact string
FileDate = 2004,06,25       // yyyy,mm,dd order must be used
CffVersion = 1,7
// ========================
// Device Header
// ========================
[Device Header]
DeviceName = "STT35F Temperature Transmitter" // Not actually present in the device?
CommGroup = 3
CommClass = Class31+Class32 // Class32 was omitted in earlier versions, but has always
applied
CommSubClass = Class3Publisher+Class3Subscriber+Class3LinkMaster
DeviceClass = 2      // Link Master
// ========================
// Management VFD
// ========================
[Device VFD 1]
VendorName = "Softing"
ModelName = "FD_MIB"
Revision = "1.51"
VersionOD = 1
ProfileNumber = 0x4D47       // defined in SM spec
// ========================
// Function Block VFD
// ========================
[Device VFD 2]
VendorName = "Honeywell"
ModelName = "STT35F"
Revision = "Rev 4.04"
VersionOD = 0x02
ProfileNumber = 0
// ========================
// Network Management Section
// ========================
[NM OD Directory]
// Object 257
// Header
DirectoryRevisionNumber=1
NumberOfDirectoryObjects=1
TotalNumberOfDirectoryEntries=8
DirectoryIndexOfFirstCompositeListReference=9
NumberOfCompositeListReferences=1
// Composite Object References
StackMgtOdIndex=290
NumberOfObjectsInStackManagement= 1
VcrListOdIndex = 291
NumberOfObjectsInVcrList=36
DlmeBasicOdIndex = 330
NumberOfObjectsInDllBasic=2
DlmeLinkMasterOdIndex = 332
NumberOfObjectsInDllLme=8
LinkScheduleListOdIndex = 343
NumberOfObjectsInDllLinkSchedule =6
DlmeBridgeOdIndex = 0       // Not used in ST35F
```

APPENDIX B-continued

```
NumberOfObjectsInDllBridge = 0
PlmeBasicOdIndex = 340
NumberOfObjectsInPhyLme = 3
ListOfMmeReferences = 9
NumberOfMmeComposites = 0
[NM Restrictions] // Communication Capability
MaximumResponseDelaySlotTime = 50 // Slowest time it takes the device to respond
(octets)
MinimumInterPduDelay = 4      // Minimum time the device needs between messages
(octets)
SlotTime = 5
// Stack Capabilities
FasArTypesAndRolesSupported   =   QUB_SERVER+QUU_SOURCE+BNU_PUBLISHER
+BNU_SUBSCRIBER
MaxDlsapAddressSupported = 16
MaxDlcepAddressSupported = 17
DlcepDeliveryFeaturesSupported = 0xBB
VersionOfNmSpecSupported = 0x103
AgentFunctionsSupported = 0x07
FmsFeaturesSupported       =      INFO_REPORT+EVENT,GET_OD+READ+WRITE
+INFO_REPORT+ACK_EVENT+GEN_DOWNLOAD
// Basic Characteristics
Version = 1
BasicStatisticsSupportedFlag = 0
DlDeviceConformance = 0x20010365
DlOperatFunctionalClass = 2
//    VCR Information
MaxEntries = 16
NumPermanentEntries = 1
DynamicsSupportedFlag = TRUE
StatisticsSupported = FALSE
// The following 6 values reflect the VCR capabilities, but are not available
// as parameters in the MIB.
MaximumNumberOfClientVcrs = 0
MaximumNumberOfServerVcrs = 15 // MAX_NO_OF_USR_VCR
MaximumNumberOfSourceVcrs = 15 // MAX_NO_OF_USR_VCR
MaximumNumberOfSinkVcrs = 0
MaximumNumberOfSubscriberVcrs = 15 // MAX_NO_OF_USR_VCR
MaximumNumberOfPublisherVcrs = 15 // MAX_NO_OF_USR_VCR
// Scheduling information
MaximumSchedulingOverhead = 4
DlmeLinkMasterCapabilitiesVariable = 0x04
NumOfSchedules = 2
NumOfSubSchedulesPerSchedule = 1
// The following 3 elements are checked by the Product when schedules are downloaded
// However, they are not available as parameters in the MIB
// All 3 of these are maximum allowable values.
NumOfSequencesPerSubSchedule = 10 //MAX_N_SEQ
NumOfElementsPerSequence = 4 // MAX_N_SEQ_ELEMS
MaximumSingleLasScheduleSize = 120 // MAX_LAS_CFG
//--------------------------------------------
// Physical Layer
//--------------------------------------------
PowerRequired = 22 // in milliamps
ChannelStatisticsSupported = 0x0
MediumAndDataRatesSupported = 0x0000000000000049
//WIRE_MEDIUM+VOLTAGE_MODE+SPEED_31KBPS
IecVersion = 0x0001 // 31.25 half duplex
NumberOfChannels =1
PowerMode = BUS_POWERED
InterfaceMode = HALF_DUPLEX
// =========================
[Server Restrictions]
FmsMaxOutstandingServicesCalling = 0
FmsMaxOutstandingServicesCalled = 1
// =========================
[NM VCR Usage 1]
// For partially configurable VCRs, the host configuration device must remember
// which attributes of the VCR are configurable. The fully configurable VCRs are not listed
here.
// Permanent Management VCR
FasArTypeAndRole = QUB+SERVER+NOBYPASS
FasDllLocalAddr = 0xF8
FasDllConfiguredRemoteAddr = FREE
FasDllSDAP                                                                                =
NONSCHEDULED+DISORDERED+AUTH_SOURCE+TIMEAVAILABLE
FasDllMaxConfirmDelayOnConnect = 60000
FasDllMaxConfirmDelayOnData = 60000
FasDllMaxDlsduSize = 128
FasDllResidualActivitySupported = RESIDUAL
```

APPENDIX B-continued

```
FasDllTimelinessClass = NONE+NODUPLICATION+NONE
FasDllPublisherTimeWindowSize = 0
FasDllPublisherSynchronizingDlcep = 0
FasDllSubscriberTimeWindowSize = 0
FasDllSubscriberSynchronizingDlcep = 0
FmsVfdID = 1
FmsMaxOutstandingServicesCalling = 0
FmsMaxOutstandingServicesCalled = 1
FmsFeaturesSupported = NONE, GET_OD+READ+WRITE+GEN_DOWNLOAD
// Other VCRs are fully configurable.
// = = = = = = = = = = = = = = = = =
// SM section
// = = = = = = = = = = = = = = = = =
[SM OD Directory]
DirectoryRevisionNumber =1
NumberOfDirectoryObjects =1
TotalNumberOfDirectoryEntries =5
DirectoryIndexOfFirstCompositeListReference =0
NumberOfCompositeListReference =0
SmAgentStartingOdIndex =258
NumberOfSmAgentObjects =4
SyncAndSchedulingStartingOdIndex =262
NumberOfSyncAndSchedulingObjects =8
AddressAssignmentStartingOdIndex =270
NumberOfAddressAssignmentObjects =3
VfdListStartingOdIndex =273
NumberOfVfdListObjects =2
FbScheduleStartingOdIndex =275
NumberOfFbScheduleObjects =5
[SM Software Download Property]
DownloadClass = 1
WriteRspReturnedForACTIVATE = 1
WriteRspReturnedForPREPARE = 1
ReadyForDwnldDelaySecs = 200
ActivationDelaySecs = 60
// = = = = = = = = = = = = = = = = =
//    SM VFD
// = = = = = = = = = = = = = = = = =
[SM VFD 1]
VFD_REF =0x1
VFD_TAG = "MIB_VFD"
[SM VFD 2]
VFD_REF =0x2
VFD_TAG = "FBAP"
// = = = = = = = = = = = = = = = = =
//    SM Capability
// = = = = = = = = = = = = = = = = =
[SM Capability]
Sm_Support  =  SET_PDTAG_AGENT+SET_ADDR_AGENT+CLR_ADDR_AGENT
+IDENTIFY_AGENT+LOC_FB_AGENT\+FMS_SERVER+TIME_SLAVE+SCHEDULE_
FB
// = = = = = = = = = = = = = = = = =
// Function Block Application VFD
// = = = = = = = = = = = = = = = = =
[VFD 2 OD Directory]
DirectoryRevisionNumber =2
NumberOfDirectoryObjects =1
TotalNumberOfDirectoryEntries =12
DirectoryIndexOfFirstCompositeListReference =17
NumberOfCompositeListReference =3
OdIndexForStartingActionObject =0
NumberOfActionObjects =0
OdIndexOfTheStartingLinkObjectInTheVfd =561
NumberOfLinkObjectsInTheVfd =14
OdIndexOfTheStartingAlertObjectInTheVfd =551
NumberOfAlertObjectsInTheVfd =3
OdIndexOfTheStartingTrendObjectInTheVfd =556
NumberOfTrendObjectsInTheVfd =2
OdIndexOfTheStartingDomainObjectInTheVfd =550
NumberOfDomainObjectsInTheVfd =1
DirectoryIndexForTheResourceBlock =23
NumberOfResourceBlocksInTheVfd =1
DirectoryIndexForTheFirstTransducerBlockPointer =25
NumberOfTransducerBlocksInTheVfd =1
DirectoryIndexForTheFirstFunctionBlockPointer =27
NumberOfFunctionBlocksInTheVfd =2
// = = = = = = = = = = = = = = = = =
//    Channels for I/O
// = = = = = = = = = = = = = = = = =
[VFD 2 Channels]
```

APPENDIX B-continued

```
Channel1 = "Sensor Temperature"
// = = = = = = = = = = = = = = = = = =
//      Resource Block
// = = = = = = = = = = = = = = = = = =
[VFD 2 Resource Block]
Block_Index =400
DD_Item =0x80020af0 //Resource block 2 with ITK_VER
Profile =0x0133
Profile_Revision =0x0101
Num_Of_Parms = 51
Views_Index = 588
Number_View_3 = 1
Number_View_4 = 1
[VFD 2 Resource Block Defaults]
// Minimum Resource Block Defaults required
MANUFAC_ID =0x48574C
DEV_TYPE =0x0101
DEV_REV =0x04
DD_REV =0x01
DD_RESOURCE = ""
HARD_TYPES = 0x8000
FEATURES =0x4800 // Reports | Hard W Lock
CYCLE_TYPE =0x8000
MIN_CYCLE_T =4000 // 125 msec
MEMORY_SIZE =0
NV_CYCLE_T =28800000 // 15 Minutes
MAX_NOTIFY =8
ITK_VER =4
// = = = = = = = = = = = = = = = = = =
//      Transducer Block
// = = = = = = = = = = = = = = = = = =
[VFD 2 Transducer Block Type 1]
Block_Index =470
DD_Item =0x20000
Profile =0x8001 // custom TB
Profile_Revision = 0
Num_Of_Parms =34
Views_Index =592
Number_View_3 =1
Number_View_4 =1
// = = = = = = = = = = = = = = = = = =
//      AI Function Block
// = = = = = = = = = = = = = = = = = =
[VFD 2 Function Block Type 1]
Block_Index =257
DD_Item =0x800201D0
Profile =0x0101 //standard AI block
Profile_Revision =0x0101 // <DD_REV>01
Execution_Time =736
Num_Of_Parms =39
Views_Index =580
Number_View_3 =1
Number_View_4 =1
// = = = = = = = = = = = = = = = = = =
//      PID Function Block
// = = = = = = = = = = = = = = = = = =
[VFD 2 Function Block Type 2]
Block_Index =310
DD_Item =0x800202B0
Profile =0x0108 //standard PID block
Profile_Revision =0x0101 // <DD_REV>01
Execution_Time =2880
Num_Of_Parms =74
Views_Index =584
Number_View_3 =1
Number_View_4 =1
// = = = = = = = = = =
// Trend Objects
// = = = = = = = = = =
[VFD 2 Trend Object Usage 0]
TrendType = FLOAT
[VFD 2 Trend Object Usage 1]
TrendType = FLOAT
```

What is claimed is:

1. A method of implementing an application in a process control system containing a plurality of field devices operable to implement desired control processes, each of said plurality of field devices having a corresponding one of a plurality of device descriptions indicating capabilities of the field device, said plurality of device descriptions being provided according to a set of specifications, said method comprising:

providing a plurality of version objects, wherein each of said plurality of version objects respectively corresponds to a corresponding one of an ordered sequence of versions of a first specification and is designed to be instantiated by a corresponding one of a plurality of class factories, wherein each of said plurality of version objects is designed to process changes in a corresponding version compared to a prior version of said ordered sequence, said first specification being contained in said set of specifications;

forming a factory information representing the specific one of class factories which can be used to instantiate the corresponding version object;

receiving a version identifier and an input data that is to be processed for managing a first field device of said plurality of field devices, said version identifier corresponding to a first version in said ordered sequence of versions and said first field device having a first device description provided according to said first version of said first specification, wherein said input data represents a portion of said first device description, said first device description being contained in said plurality of device descriptions;

examining said factory information to select a first class factory corresponding to said first version, said first class factory being designed to instantiate a first version object which in turn is designed to process said input data;

instantiating a version instance of said first version object using said first class factory selected based on said examining; and processing said input data using said version instance to identify device capability of said first field device, as a basis for management of said first field device.

2. The method of claim 1, wherein said factory information is in the form of a linked list of a plurality of nodes, wherein each node points to a corresponding class factory, wherein said examining determines said first class factory by traversing said linked list.

3. The method of claim 2, wherein said determining determines said first class factory as corresponding to a version object of a version number greater than or equal to said version identifier.

4. The method of claim 3, wherein each of said plurality of class factories derives from a same base factory, which also defines a create instance method to instantiate said version instance.

5. The method of claim 4, wherein each of said plurality of version objects except a version object for the start version derives from a version object designed to process an immediate previous version.

6. The method of claim 5, wherein said plurality of version objects contains a last version object designed to handle sections defined by any higher version for which version objects are not provided, wherein each section represents a portion of said input data.

7. The method of claim 6, wherein said last version object tolerates processing sections added or modified by said any higher version.

8. The method of claim 6, wherein said application is upgraded to support a new version, further comprising:

adding a new version object which derives from an object designed to process sections changed or added by a previously highest version of a standard supported by said application;

adding a new class factory which is designed to instantiate said new version object;

inserting a new node into said linked list corresponding to said new class factory, wherein said new node is placed between a pair of nodes corresponding to said previously highest version and said last version object.

9. The method of claim 6, wherein each of said plurality of version objects except said version object of said start version is designed to invoke a method from a base version from which the version object derives to process each section, wherein each of said plurality of version objects returns a failure indication when the section cannot be processed by the version object, wherein each of said plurality of version objects returns a success indication when the section can be successfully processed, wherein each of said plurality of version objects passes a success indication to the invoking version object when a success indication is received, and wherein each of said plurality of version objects uses a handling logic to process the section if the corresponding process section method exists and a failure indication is received.

10. The method of claim 9, wherein said application comprises a parser, said input data comprises device descriptions used in the management of a plurality of field devices in said process control plant.

11. A machine readable medium storing one or more sequences of instructions for causing a system to parse device descriptions in the management of a plurality of field devices in a process control plant, said plurality of field devices operable to implement desired control processes, each of said plurality of field devices having a corresponding one of a plurality of device descriptions indicating capabilities of the field device, said plurality of device descriptions being provided according to a set of specifications, wherein each device description is in one of an ordered sequence of versions of a first specification and contains a plurality of sections, wherein execution of said one or more sequences of instructions by one or more processors contained in said system causes said system to perform the actions of:

providing a plurality of parser objects, wherein each of said plurality of parser objects respectively corresponds to one of a corresponding said ordered sequence of versions and is designed to be instantiated by a corresponding one of a plurality of class factories, wherein each of said plurality of parser objects is designed to parse at least a set of sections added or modified by a corresponding version compared to a prior version of said ordered sequence, said first specification being contained in said set of specifications;

forming a factory information representing the specific one of class factories which can be used to instantiate the corresponding parser object;

receiving a version identifier of a device description that is to be parsed for managing a first field device of said plurality of field devices, said version identifier corresponding to a first version in said ordered sequence of versions and said device description provided according to said first version of said first specification, said device description being contained in said plurality of device descriptions;

examining said factory information to select a first class factory corresponding to said first version, said first class factory being designed to instantiate a first parser object which in turn is designed to parse said device description;

instantiating a parser instance of said first parser object using said first class factory selected based on said examining; and processing said device description using said parser instance to identify device capability of said first field device, as a basis for management of said first field device.

12. The machine readable medium of claim 11, wherein said factory information is in the form of a linked list of a plurality of nodes, wherein each node points to a corresponding class factory, wherein said examining determines said first class factory by traversing said linked list.

13. The machine readable medium of claim 12, wherein said determining determines said first class factory as corresponding to a parser object of a version number greater than or equal to said version identifier.

14. The machine readable medium of claim 13, wherein each of said plurality of class factories derives from a same base factory, which also defines a create instance method to instantiate said parser instance.

15. The machine readable medium of claim 14, wherein each of said plurality of parser objects except a parser object for the start version derives from a parser object designed to parse an immediate previous version.

16. The machine readable medium of claim 15, wherein said plurality of parser objects contains a last parser object designed to handle sections defined by any higher version for which parser objects are not provided, wherein said last version object tolerates processing sections added or modified by said any higher version.

17. The machine readable medium of claim 16, wherein said last parser object returns an error code when parsing sections added or modified by said any higher version, thereby providing tolerance to changes in said any higher version.

18. The machine readable medium of claim 16, wherein said parser is upgraded to support a new version of said standard, further comprising:

adding a new parser object which derives from an object designed to parse sections changed or added by a previously highest version of said standard supported by said parser;

adding a new class factory which is designed to instantiate said new parser object;

inserting a new node into said linked list corresponding to said new class factory, wherein said new node is placed between a pair of nodes corresponding to said previously highest version and said last parser object.

19. The machine readable medium of claim 18, wherein each of said plurality of parser objects except said parser object of said start version is designed to invoke a method from a base version from which the parser object derives to parse each section, wherein each of said plurality of parser objects return a failure indication when the section cannot be parsed by the parser object, wherein each of said plurality of parser objects returns a success indication when the section can be successfully parsed, wherein each of said plurality of parser objects passes a success indication to invoking parser object when a success indication is received, and wherein each of said plurality of parser objects uses a handling logic to parse the section if the corresponding process section method exists and a failure indication is received.

20. A digital processing system operating in a process control plant containing a plurality of field devices operable to implement desired control processes, each of said plurality of field devices having a corresponding one of a plurality of device descriptions indicating capabilities of the field device, said plurality of device descriptions being provided according to a set of specifications, said digital processing system comprising:

a secondary storage to provide a plurality of version objects and a plurality of class factories, wherein each of said plurality of version objects respectively corresponds to a corresponding one of an ordered sequence of versions of a first specification and is designed to be instantiated by a corresponding one of said plurality of class factories, wherein each of said plurality of version objects is designed to process changes in a corresponding version compared to a prior version of said ordered sequence, said first specification being contained in said set of specifications;

a processor to form a factory information representing the specific one of class factories which can be used to instantiate the corresponding version object;

an interface to receive a version identifier and an input data that is to be processed for managing a first field device of said plurality of field devices, said version identifier corresponding to a first version in said ordered sequence of versions and said first field device having a first device description provided according to said first version of said first specification, wherein said input data represents a portion of said first device description, said first device description being contained in said plurality of device descriptions, wherein said processor is operable to:

examine said factory information to select a first class factory corresponding to said first version, said first class factory being designed to instantiate a first version object which in turn is designed to process said input data;

instantiate a version instance of said first version object using said first class factory selected based on said examining; and process said input data using said version instance to identify device capability of said first field device, as a basis for management of said first field device.

21. The digital processing system of claim 20, wherein said plurality of version objects contains a last version object designed to handle sections defined by any higher version for which version objects are not provided, wherein each section represents a portion of said input data.

* * * * *